(12) United States Patent
Umayahara et al.

(10) Patent No.: US 8,273,490 B2
(45) Date of Patent: Sep. 25, 2012

(54) FUEL CELL SYSTEM

(75) Inventors: Kenji Umayahara, Nishikamo-gun (JP); Takeshi Maenaka, Toyota (JP); Atsushi Imai, Gamagori (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 262 days.

(21) Appl. No.: 12/680,840

(22) PCT Filed: Dec. 18, 2008

(86) PCT No.: PCT/JP2008/073061
§ 371 (c)(1),
(2), (4) Date: Mar. 30, 2010

(87) PCT Pub. No.: WO2009/081835
PCT Pub. Date: Jul. 2, 2009

(65) Prior Publication Data
US 2010/0209792 A1    Aug. 19, 2010

(30) Foreign Application Priority Data

Dec. 25, 2007 (JP) .................................. 2007-332464

(51) Int. Cl.
*H01M 8/04* (2006.01)

(52) U.S. Cl. ....................................... 429/428; 429/429

(58) Field of Classification Search .................... None
See application file for complete search history.

(56) References Cited

U.S. PATENT DOCUMENTS

2008/0220298 A1 *  9/2008  Ishikawa et al. ................. 429/22

FOREIGN PATENT DOCUMENTS

| JP | 2003-111384 A | 4/2003 |
| JP | 2003-235252 A | 8/2003 |
| JP | 2006-033934 A | 2/2006 |
| JP | 2006-311776 A | 11/2006 |
| WO | WO 2005076433 A1 * | 8/2005 |

* cited by examiner

*Primary Examiner* — Ula C Ruddock
*Assistant Examiner* — Scott J Chmielecki
(74) *Attorney, Agent, or Firm* — Kenyon & Kenyon LLP

(57) ABSTRACT

Provided is a fuel cell system that can change the number of active phases in a DC/DC converter in order to prevent overcurrent from flowing through one point (e.g., a reactor of the DC/DC converter) in the system. In step S1, whether or not the system is in a state that causes a rapid change in a voltage command value is checked. If the system is in a state that causes a rapid change in the voltage command value, the processing goes to step S2, and if not, the processing goes to step S3. In step S2, a DC/DC converter is prohibited from being driven in a single phase and the processing ends. In step S3, the DC/DC converter is permitted to be driven in a single phase and the processing ends.

7 Claims, 6 Drawing Sheets

FIG. 5

| FC POWER GENERATION STATE | FC POWER GENERATION MODE | SYSTEM STATE |
|---|---|---|
| NORMAL | IN OPERATION | IN STARTUP SEQUENCE FOR FUEL CELL SYSTEM, OR IN CERTAIN PERIOD UPON SHIFTING FROM THE STARTUP SEQUENCE TO NORMAL OPERATION UNTIL OPERATION CONDITION IS STABILIZED |
| | STOPPED | IN HYDROGEN CONSUMPTION CONTROL FOR FUEL CELL |
| | STOPPED | DETECTING ANY WELDING IN RELAY OF FUEL CELL |
| | IN OPERATION | IN CURRENT LIMITATION PROCESSING FOR FUEL CELL |
| | IN OPERATION | IN OUTPUT LIMITATION PROCESSING |
| | IN OPERATION → STOP | IN SHUTDOWN SEQUENCE FOR FUEL CELL SYSTEM |
| NORMAL → INTERMITTENT | IN OPERATION | INTERMITTENT OPERATION OFF → ON |
| INTERMITTENT | IN OPERATION | DETECTING ANY FUEL GAS LEAKAGE FROM FUEL CELL SYSTEM |
| | IN OPERATION | IN INTERMITTENT OPERATION WHERE LOAD DEVICE DOES NOT OPERATE |
| | IN OPERATION | IN PREDETERMINED PERIOD OF RETURN PROCESSING FROM CATALYST ACTIVATION PROCESSING FOR FUEL CELL |
| | IN OPERATION | IN PREDETERMINED PERIOD OF RETURN PROCESSING AFTER CATALYST ACTIVATION PROCESSING FOR FUEL CELL IS SUSPENDED |
| INTERMITTENT → NORMAL | IN OPERATION | INTERMITTENT OPERATION ON → OFF |
| NORMAL/INTERMITTENT | IN OPERATION | HIGH-VOLTAGE PREVENTION PERMISSION FLAG OFF → ON |
| | IN OPERATION | HIGH-VOLTAGE PREVENTION TARGET VOLTAGE CHANGING RAPIDLY |
| | IN OPERATION | UPON PERMISSION OR PROHIBITION OF POWER SUPPLY TO LOAD DEVICE | ns
FUEL CELL SYSTEM

This is a 371 national phase application of PCT/JP2008/073061 filed 18 Dec. 2008, which claims priority to Japanese Patent Application No. 2007-332464 filed 25 Dec. 2007, the contents of which are incorporated herein by reference.

FIELD OF THE INVENTION

The present invention relates to a fuel cell system, and particularly to a fuel cell system having a DC/DC converter which is provided with a plurality of phases and can change the number of phases, in which disadvantages that could result from changing the number of phases can be addressed.

BACKGROUND OF THE INVENTION

Most fuel cell systems are provided with a fuel cell and a battery that is charged with excess power or regenerative power from the fuel cell. In these fuel cell systems, since the fuel cell output voltage and the battery input/output voltage differ, power supply is configured to be performed by using a DC/DC converter to increase or decrease the voltage of a primary side, to which the battery is connected, to the voltage of a secondary side, to which the fuel cell is connected, or to decrease or increase the secondary side voltage to the primary side voltage.

In recent years, DC/DC converters have been developed in which several phase circuits are connected in parallel and the number of active phases can be changed. For example, Japanese laid-open patent publication No. 2006-33934 discloses a configuration in which a change of system load is predicted and the number of phases of a DC/DC converter can be changed according to the predicted load (see Patent Document 1).

Also, Japanese laid-open patent publication No. 2003-235252 suggests a power supply circuit with a master/slave-type multistage DC/DC converter, in which the input power (Pin) and output power (Pout) of the DC/DC converter are measured using a measurement device to determine the number of parallel stages of the DC/DC converter according to the output power (Pout), and the conversion efficiency (Pin/Pout) of the DC/DC converter according to increments in a commanded output voltage is calculated so as to determine the commanded output voltage that can maximize the efficiency (see Patent Document 2).

As a suggestion regarding a multiphase DC/DC converter itself, for example, Japanese laid-open patent publication No. 2006-311776 suggests a multiphase DC/DC converter that can achieve cost reduction and a long product lifetime (see Patent Document 3).

Patent Document 1: Japanese laid-open patent publication No. 2006-33934
Patent Document 2: Japanese laid-open patent publication No. 2003-235252
Patent Document 3: Japanese laid-open patent publication No. 2006-311776

SUMMARY OF THE INVENTION

Problem to be Solved by the Invention

The above-mentioned known techniques can improve efficiency, etc., by switching multiple phases of a DC/DC converter according to system load or input/output power of the DC/DC converter; however, if the state of system operation changes rapidly, for example, if the output voltage value commanded to the fuel cell changes rapidly and the actual output voltage value of the fuel cell also changes rapidly, the system would be unfavorably affected (e.g., overcurrent would flow through the DC/DC converter), and such a problem has not been taken into consideration.

Accordingly, an object of the present invention is to provide a fuel cell system having a voltage converter that is provided with a plurality of phases and configured such that the number of active phases can be changed, wherein the number of phases can be controlled to be changed so as not to result in any disadvantages for the voltage converter.

Means for Solving the Problem

In order to solve the above problem, a fuel cell system according to the present invention has a voltage converter (for example, a DC-DC converter) which is provided with a plurality of phases and configured such that the number of active phases can be changed, and this fuel cell system includes: a detection unit that detects a system state that causes a certain amount of change or more in an output voltage command value for a fuel cell; and a prohibition unit that, if the above-specified system state is detected, prohibits the voltage converter from being driven in a predetermined number of phases or less.

With this configuration, if the system is in a state that causes a certain amount of change or more, i.e., a rapid change, in the output voltage command value for the fuel cell, driving the voltage converter in a predetermined number of phases or less is prohibited in advance, and accordingly, disadvantages, such as overcurrent flowing through the voltage converter, can effectively be prevented.

The term "output voltage command value for the fuel cell" used herein refers to a control value commanding a voltage to be output from the fuel cell, but it may also be deemed as an "output voltage value" which is a voltage output from the fuel cell as a result of the control based on the output voltage command value.

When saying that "a certain amount of change or more" occurs in the "output voltage command value" explained above, it includes the case where the "output voltage command value" changes rapidly, and the above change may indicate the same particular rate of change or a greater rate of change regardless of system state differences, but may also indicate different rates of change depending on system state differences. Also, "a system state that causes a certain amount of change or more" used herein should not be strictly interpreted as meaning that "a certain amount of change or more" actually occurs if the system is in that state, but instead, it means a system state where the "output voltage command value" can be predicted to probably change rapidly.

Here, it is preferable that the prohibition unit prohibits driving the voltage converter in the predetermined number of phases or less if the above-specified system state is detected. With this configuration, if the system is in a state where the output voltage of the fuel cell could change rapidly, driving the voltage converter in the predetermined number of phases or less is prohibited, and accordingly, disadvantages, such as an extreme increase in reactor current, can effectively be eliminated.

Here, it is preferable that if the above-specified system state is detected where the voltage converter is already driven in the predetermined number of phases or less, the prohibition unit changes the voltage converter so that the voltage converter is driven in a greater number of phases than the predetermined number of phases. With this configuration, if a system state where the output voltage of the fuel cell could change rapidly is detected where the voltage converter is driven in the predetermined number of phases or less, the voltage converter is immediately changed so that it is driven in a greater number of phases than the predetermined number of phases, and accordingly, even if the fuel cell output voltage changes rapidly, disadvantages, such as an extreme increase in the reactor current of a particular phase, can effectively be eliminated.

The present invention is embodied as a fuel cell system in which a power storage device is connected to a primary side of a voltage converter, a fuel cell is connected to a secondary side of the voltage converter, and a load device is connected to at least one of the primary and secondary sides of the voltage converter. This is because driving the voltage converter by changing the number of phases is effective in the above configuration.

For example, the system state that causes a certain amount of change or more in the output voltage command value for the fuel cell includes, under a normal operation mode, at least one of the following states.

1) State of being in a startup sequence for the fuel cell system, or in a certain period upon shifting from the startup sequence to the normal operation until operation condition is stabilized.

This is, for example, the state from the time the system is booted up, in which the necessary processing for startup is completed and the fuel cell output voltage is changed in order to increase the output power of the fuel cell for the normal operation until the output voltage is stabilized. More specifically, if the fuel cell system is installed as a power source of an electric vehicle, the above state refers to a specific period from the time the startup sequence (e.g., system check and warm-up operation) is completed and the fuel cell voltage is reduced in response to the control of the accelerator.

2) State of being in hydrogen consumption control for the fuel cell.

This is the state of power generation for consumption of remaining fuel gas, which should be performed during the system shutdown processing. More specifically, this refers to the state where the system is shut down, the fuel cell is intermittently or continuously switched to a power-generation mode to consume the fuel gas in the fuel gas piping of the fuel cell, and the output voltage could be changed to a predetermined low voltage that is a power-generation voltage.

3) State of detecting whether any welding has occurred in a relay of the fuel cell.

This is the state of inspecting whether any welding has occurred in a relay which is provided in an output terminal of the fuel cell for the purpose of breaking abnormal current in order to prevent electric leaks, etc. More specifically, in order to detect that the relay contact does not recover from the ON state even though no current is applied for operating the relay, the voltage of the fuel cell side of the voltage converter is increased and decreased without applying current for operating the relay, and whether any welding has occurred in the relay is inspected according to the detected current from the fuel cell. The above state refers to the state where the output voltage of the fuel cell is changed for that inspection.

4) State of being in current limitation processing for the fuel cell.

This is the state where any of the cells constituting the fuel cell has a voltage drop to or below an allowable voltage. More specifically, if any of the cell voltages detected by a cell monitor goes down to a reference voltage or lower, current supply from the fuel cell should be temporarily stopped, and the above state refers to the state where the output voltage of the fuel cell is returned to a predetermined high voltage for that purpose.

5) State of being in output limitation processing.

This is the state where output limitation processing is performed because an error has occurred in a load device of the system. More specifically, the above state refers to, for example, the state where, upon an error signal due to overcurrent or overheat being output from an inverter that supplies current to a load device (e.g., motor), the output voltage of the fuel cell is returned to a predetermined high voltage so as to temporarily stop current supply to that load device. The above state also includes the state where output limitation is commanded by the fuel cell controller due to an increased temperature of the fuel cell or for reasons pertaining to the fuel gas supply system.

6) State of being in a shutdown sequence for the fuel cell system.

This is the state where the power generation by the fuel cell is stopped to shut down the system. More specifically, the above state refers to the state where the system shutdown is commanded, no output request is issued to the system, and the output voltage of the fuel cell is returned to a predetermined high voltage so as to reduce the output current of the fuel cell.

For example, the system state that causes a certain amount of change or more in the output voltage command value for the fuel cell includes the state where the system is in transition from a normal operation mode to an intermittent operation mode.

This refers to the state where, in order to shift the system from a power generation state to a stop/stand-by state, power supply to a load device is stopped and the output voltage of the fuel cell is changed to a predetermined high voltage to reduce the power generation current.

For example, the system state that causes a certain amount of change or more in the output voltage command value for the fuel cell includes, under an intermittent operation mode, at least one of the following states.

1) State of detecting any fuel gas leakage from the fuel cell system.

This is the state of detecting any fuel gas leakage when the system is stopped or in a stand-by state. More specifically, whether or not fuel gas leaks from the fuel gas piping, etc., of the system needs to be inspected in the state in which the power generation by the fuel cell is stopped, and the above state refers to the state where the fuel cell is rapidly changed to have a predetermined high voltage or high-voltage prevention voltage for that inspection.

The term "high-voltage prevention voltage" used herein refers to a specific voltage lower than the maximum voltage of the fuel cell and the fuel cell is controlled so as not to exceed that specific voltage in order to improve the durability of the fuel cell.

2) State of being in an intermittent operation where a load device does not operate.

This is the state where an insulation resistance provided in the system is checked upon shutdown of the system. More specifically, since the insulation resistance needs to be checked while changing the power generation voltage of the fuel cell, the power generation voltage is changed for that purpose.

3) State of being in a predetermined period of return processing from catalyst activation processing for the fuel cell.

This refers to the state of being in so-called refresh processing to activate the catalyst of the fuel cell. More specifically, in the refresh processing, the output voltage of the fuel cell needs to be reduced to a predetermined low voltage that causes the reduction reaction of the catalyst.

4) State of being in a predetermined period of the return processing after the catalyst activation processing for the fuel cell is suspended.

This refers to the state where the refresh processing is suspended and the output voltage of the fuel cell is changed. More specifically, during the refresh processing, the fuel cell output voltage continues to be reduced to keep a low voltage for a certain period, thereby causing the reduction reaction of the catalyst; whereas, if it becomes necessary to suspend the refresh processing, the output voltage of the fuel cell needs to be returned to the former state.

For example, the system state that causes a certain amount of change or more in the output voltage command value for the fuel cell includes the state where the system is in transition from an intermittent operation mode to a normal operation mode.

This refers to the state where the system shifts from a stop/stand-by state, i.e., a low-load state to an output state. More specifically, when an output request is issued to the system (e.g., the accelerator is pressed) and power needs to be supplied directly from the fuel cell, the fuel cell output voltage needs to be reduced to increase the output power.

For example, the system state that causes a certain amount of change or more in the output voltage command value for the fuel cell includes, under a normal operation mode or an intermittent operation mode, at least one of the following states.

1) State of being in a certain period upon permission or prohibition of a high-voltage prevention operation until voltage condition is stabilized.

This refers to the state immediately after the permission or prohibition of the power generation with the output voltage limited to a voltage equal to or lower than a high-voltage prevention voltage, which is an upper limit voltage for improving the durability of the fuel cell. More specifically, permission and prohibition of the power generation with the high-voltage prevention voltage are controlled and switched in accordance with the system state, the power generation state of the fuel cell, a low-temperature operation mode, the switching of controls for temperature increases in a power storage device, etc. The output voltage of the fuel cell changes rapidly upon such switching of the permission and prohibition.

2) State of being with a target voltage of the high-voltage prevention operation showing a predetermined rate of change or greater rate of change.

This refers to the state where the load state changes and the target voltage of the high-voltage prevention operation (namely, the high-voltage prevention voltage) changes along with the load state. More specifically, if the fuel cell system is utilized as a drive source of an electric vehicle, the target voltage of the high-voltage prevention operation changes in response to the gear shift position, and accordingly, when any gear shift is detected, the output voltage of the fuel cell can be expected to change.

3) State of being in a certain period upon permission or prohibition of power supply to a load device until power condition is stabilized.

This refers to the state where the state of power supply to a load device is changed. More specifically, if the fuel cell system is utilized, for example, as a power source of an electric vehicle, the output voltage of the fuel cell changes, for example, if an error, such as overheat, is detected in a traction motor itself or in an inverter and the drive permission state is changed.

A fuel cell system control method according to the present invention is a method for controlling a fuel cell system having a voltage controller which is provided with a plurality of phases and configured such that the number of active phases can be changed, the method comprising the steps of: detecting a system state that causes a certain amount of change or more in an output voltage command value for a fuel cell; and if the above system state is detected, prohibiting the voltage converter from being driven in a predetermined number of phases or less.

Here, it is preferable that the prohibiting step prohibits driving the voltage converter in the predetermined number of phases or less if the above-specified system state is detected.

Furthermore, it is preferable that if the above-specified system state is detected where the voltage converter is already driven in the predetermined number of phases or less, the prohibiting step changes the voltage converter so that the voltage converter is driven in a greater number of phases than the predetermined number of phases.

Effect of the Invention

According to the present invention, a system state that could result in disadvantages for the system is detected in advance, and if the system is in such a state, driving the voltage converter in a small number of phases is prohibited. Accordingly, it is possible to effectively eliminate disadvantages such as overcurrent flowing through the voltage converter.

BRIEF DESCRIPTION OF THE DRAWINGS

FIG. 5 is an explanatory diagram showing the classification of the system states that causes a rapid change in the voltage value commanded to the fuel cell 22.

DETAILED DESCRIPTION

A preferred embodiment of the present invention will be described below with reference to the drawings.

In this embodiment, the present invention is applied to a hybrid fuel cell system to be installed in a mobile object such as an electric vehicle.

(System Configuration)

Figure 1:
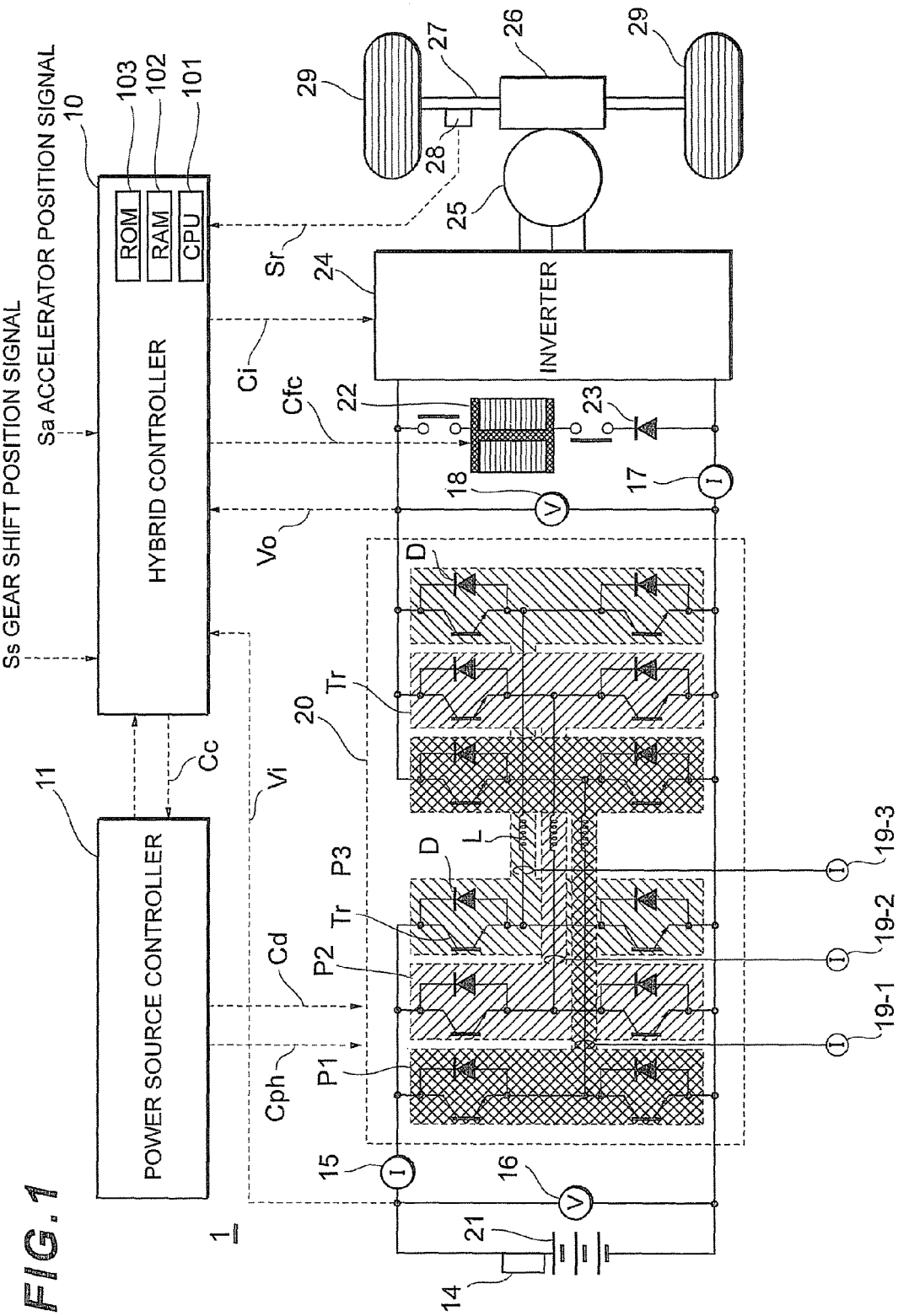
FIG. 1 is an overall system view of a fuel cell system according to an embodiment of the present invention.

FIG. 1 is an overall system view of a fuel cell system according to an embodiment of the present invention.

A hybrid-type fuel cell system (hybrid fuel cell system 1) according to this embodiment has: a DC-DC converter 20, a high-voltage battery 21 which corresponds to a power storage device, a fuel cell 22, a reverse current preventing diode 23, an inverter 24, a traction motor 25, a differential 26, a shaft 27, wheels 29, a hybrid controller 10, and power source controller 11.

The high-voltage battery 21 is formed of a plurality of layered and serially-connected chargeable/dischargeable battery units, such as nickel-hydrogen cells, so that a predetermined voltage can be output. A battery computer 14 that can communicate with the hybrid controller 10 is provided at the output terminal of the high-voltage battery 21, and the battery computer 14 controls the state of charge of the high-voltage battery 21 to maintain a proper value that would not result in overcharge or overdischarge, and functions to maintain safety if an error occurs in the high-voltage battery.

The DC-DC converter 20 concerns a voltage converter of the present invention, and is a bidirectional voltage converter that converts (increases or decreases the voltage of) a power input to a primary side (input side, battery 21 side) to have a voltage value different from the primary side and outputs it to a secondary side (output side, fuel cell 22 side), and conversely converts a power input to the secondary side to have a voltage different from the secondary side and outputs it to the primary side. In this embodiment, by increasing a DC output voltage (e.g., around 200 V) of the high-voltage battery 21 to a higher DC voltage (e.g., around 500 V), the traction motor 25 can be driven with low current and high voltage, thereby reducing power loss resulting from power supply, and enabling the traction motor 25 to be a high power motor.

The DC-DC converter 20 has a plurality of phase circuits and is configured such that the number of active phases can be changed. More specifically, the DC-DC converter 20 employs a three-phase operation system, and as to a specific circuit system, the DC-DC converter 20 has a circuit configuration of a three-phase bridge type converter. As shown in FIG. 1, in the three-phase bridge type converter circuit configuration, three bridge type converter phase circuits (P1, P2, P3) are connected in parallel. Each phase circuit has a combination of a circuit portion similar to an inverter, which temporarily converts an input DC voltage to an alternating current, and a portion that rectifies the alternating current again and converts it to a different DC voltage. More specifically, parallel connections of a switching device Tr and a rectifier D are provided in two-tiered structure, both between the primary side input terminals and between the secondary side output terminals, and the intermediate points of the respective two-tiered structures on the primary side and the secondary side are connected via a reactor L. For the switching device Tr, for example, an IGBT (Insulated Gate Bipolar Transistor) may be used, and for the rectifier D, a diode may be used. The DC-DC converter 20 is configured to be switched at adjusted moments so that the phase difference between each phase circuit becomes 120° ($2\pi/3$).

Here, the DC-DC converter 20 is configured to be able to arbitrarily change the active phases based on a phase switching control signal Cph from the power source controller 11. This embodiment is configured to switch a three-phase operation and a single-phase operation to each other based on an actual measurement load or load prediction.

Also, when the DC-DC converter 20 temporarily converts a direct current to an alternating current by the three-phase bridge type circuit configuration, the duty ratio of the alternating current can be changed in response to a duty ratio control signal Cd from the power source controller 11. Since the duty ratio of the alternating current changes the effective value of power passing through the converter, it consequently changes the output power and output voltage of the converter. Changing the duty ratio enables quick output adjustment. Temporary change of the duty ratio as described above is particularly effective in a transitional period between the control operations constantly performed by the converter.

Note that an input current of the DC-DC converter 20 can be measured by a current sensor 15, and an input voltage V1 can be measured by a voltage sensor 16. Also, an output current of the DC-DC converter 20 can be measured by a current sensor 17, and an output voltage V0 can be measured by a voltage sensor 18. Also, the reactor L in each phase is provided with a current sensor 19 (19-1, 19-2, 19-3) which is configured to be able to detect the current flowing through the reactor.

Also, during a low-load operation or braking operation, the DC-DC converter 20 can perform a regenerative operation in which the traction motor 25 is conversely used as a generator to generate power and a DC voltage is converted from the secondary side to the primary side of the converter so as to charge the high-voltage battery 21.

The fuel cell stack 22 is formed of a plurality of stacked and serially-connected unit cells. The unit cell has a configuration in which a polymer electrolyte membrane, etc., is interposed between two electrodes, a fuel electrode and an air electrode, to form an assembly of MEA and the MEA is interposed between separators for supplying fuel gas and oxidant gas. In the anode, an anode catalyst layer is provided on a porous support layer, and in the cathode, a cathode catalyst layer is provided on a porous support layer.

The fuel cell stack 22 has a fuel gas supply system, an oxidant gas supply system and a coolant supply system, which are not shown in the drawing, and is able to generate an arbitrary amount of power by controlling the fuel gas supply and the oxidant gas supply according to control signals Cfc from the hybrid controller 10.

The inverter 24 is an inverter for a driving motor, and converts a high-voltage direct current boosted by the DC-DC converter 20 to a three-phase alternating current with a 120-degree difference between each phase. The inverter 24 performs current control according to an inverter control signal Ci from the hybrid controller 10.

The traction motor 25 serves as the main motive power of the electric vehicle in this embodiment, and it also generates regenerative power during deceleration. The differential 26 is a decelerator, decelerating a high-speed rotation of the traction motor 25 to a predetermined rotation frequency and rotating the shaft 27 to which tires 29 are provided. The shaft 27 has a wheel speed sensor 28, whereby a wheel speed pulse Sr can be output to the hybrid controller 10.

The hybrid controller 10 is a computer system for controlling the entire system, and has, for example, a central processing unit (CPU) 101, RAM 102, and ROM 103. The hybrid controller 10 is programmed to control the overall system operation by: receiving, as inputs, an accelerator position signal Sa, a gear shift position signal Ss, a wheel speed signal Sr from the wheel speed sensor 28, and other signals from various sensors; obtaining the amount of power generation by the fuel cell stack 22 and the torque in the traction motor 25 according to the operational state; calculating power balance in the fuel cell stack 22, traction motor 25 and high-voltage battery 21; and counting losses in the DC-DC converter 20 and inverter 24. Also, the hybrid controller 10 can recognize a power flowing through the primary side of the DC-DC converter 20 from an input current detected by the current sensor 15 and an input voltage detected by the voltage sensor 16, and can also recognize a power flowing through the secondary side of the DC-DC converter 20 from an output current detected by the current sensor 17 and an output voltage detected by the voltage sensor 18. The hybrid controller 10 can also recognize a current passing through each phase of the DC-DC converter 20 based on the detection signals from the current sensors 19-1 to 19-3.

In particular, in this embodiment, the hybrid controller corresponds to a system state detection unit and a prohibition unit for prohibiting the change of the number of phases according to the present invention.

The power source controller 11 is a computer system for controlling the power source, in particular, the converter, and in a similar way to the hybrid controller 10, the power source controller 11 has a central processing unit (CPU), RAM, ROM, etc., which are not shown in the drawing. The power source controller 11 can change the number of active phases by outputting a phase switching control signal Cph to the DC-DC converter 20 based on a converter control signal Cc supplied from the hybrid controller 10. The power source controller 11 can also change the duty ratio of an alternating current by outputting a duty ratio control signal Cd to the DC-DC converter 20 based on a converter control signal Cc.

Figure 2:
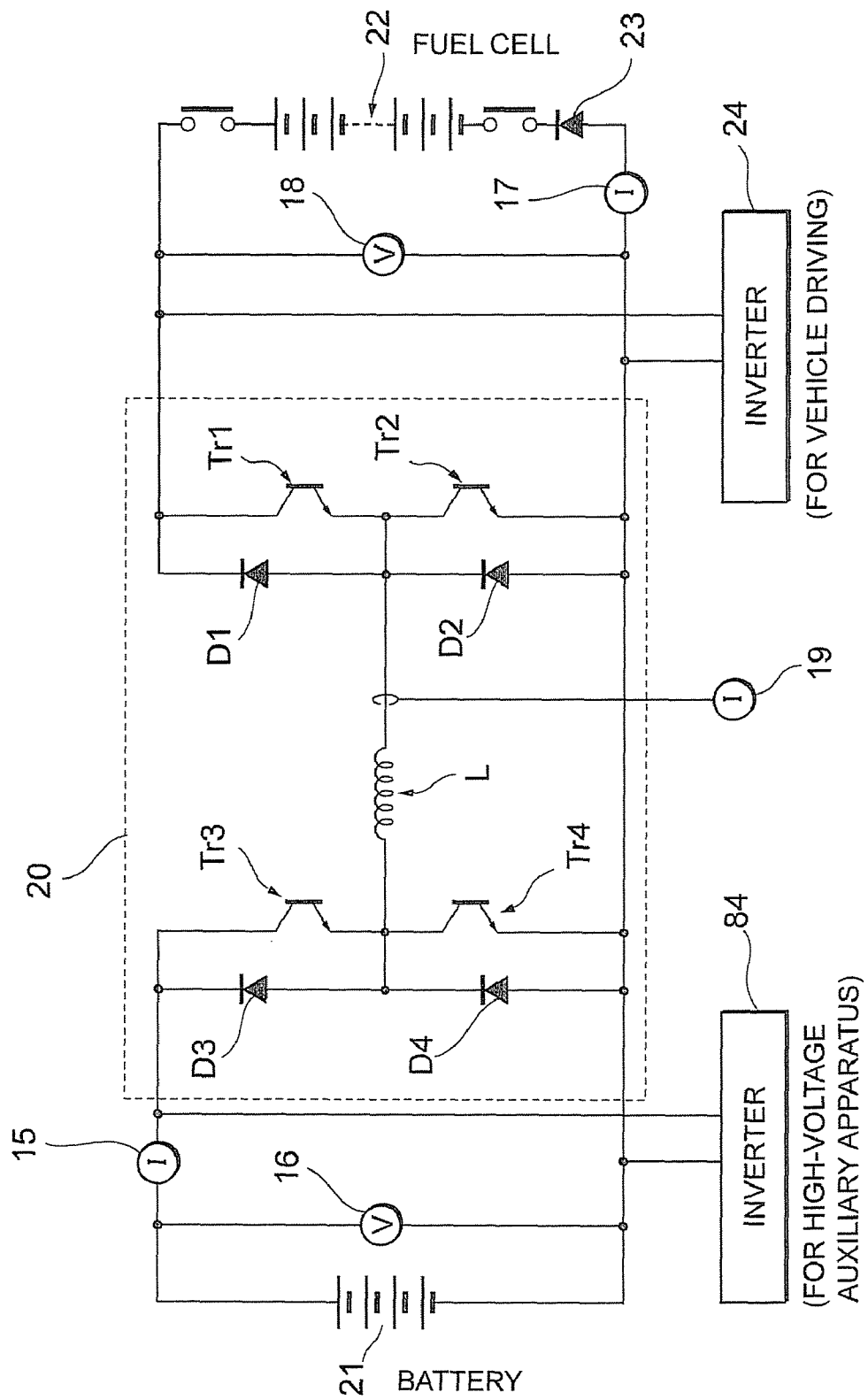
FIG. 2 is a configuration diagram of a load drive circuit, mainly depicting a single phase circuit constituting one phase of a DC-DC converter 20.

FIG. 2 is a configuration diagram of a load drive circuit, extracting one phase of the circuit of the DC-DC converter 20.

As shown in FIG. 2, (one phase of) the DC-DC converter 20 has switching devices Tr1-Tr4, diodes D1-D4 and a reactor L, and in the output side of the fuel cell 22 (secondary side), a parallel-connected circuit of the switching device Tr1 and diode D1 and a parallel-connected circuit of the switching device Tr2 and diode D2 are connected in series (in a two-tiered form). Also, in the output side of the high-voltage battery 21 (primary side), a parallel-connected circuit of the switching device Tr3 and diode D3 and a parallel-connected circuit of the switching device Tr4 and diode D4 are connected in series (in a two-tiered form).

The above circuit configuration of the DC-DC converter 20 is formed of a combination of a circuit portion having an inverter function for temporarily converting an input DC voltage to an alternating current and a circuit portion for rectifying the resulting alternating current again and converting it to a different DC voltage.

In the DC-DC converter 20, the above-described serial connection has one contact in the output side of the fuel cell 21 and another contact in the output side of the battery 21, and the two contacts are electrically connected via the reactor L, and the current passing through the reactor L can be measured by the current sensor 19.

In FIG. 2, an inverter 84 (not shown in FIG. 1) for a high-voltage auxiliary apparatus is connected to the input side of the DC-DC converter 20, and the inverter 24 for the driving motor traction motor 25 is connected to the output side. Load devices connected to the primary side and secondary side of the DC-DC converter 20 may arbitrarily be selected, but it is suitable to determine such load devices according to the primary side voltage and the secondary side voltage. Connecting a load device that consumes a large amount of power to a high-voltage side (secondary side in this embodiment) and controlling power with high voltage and low current is an efficient method.

Figure 3:
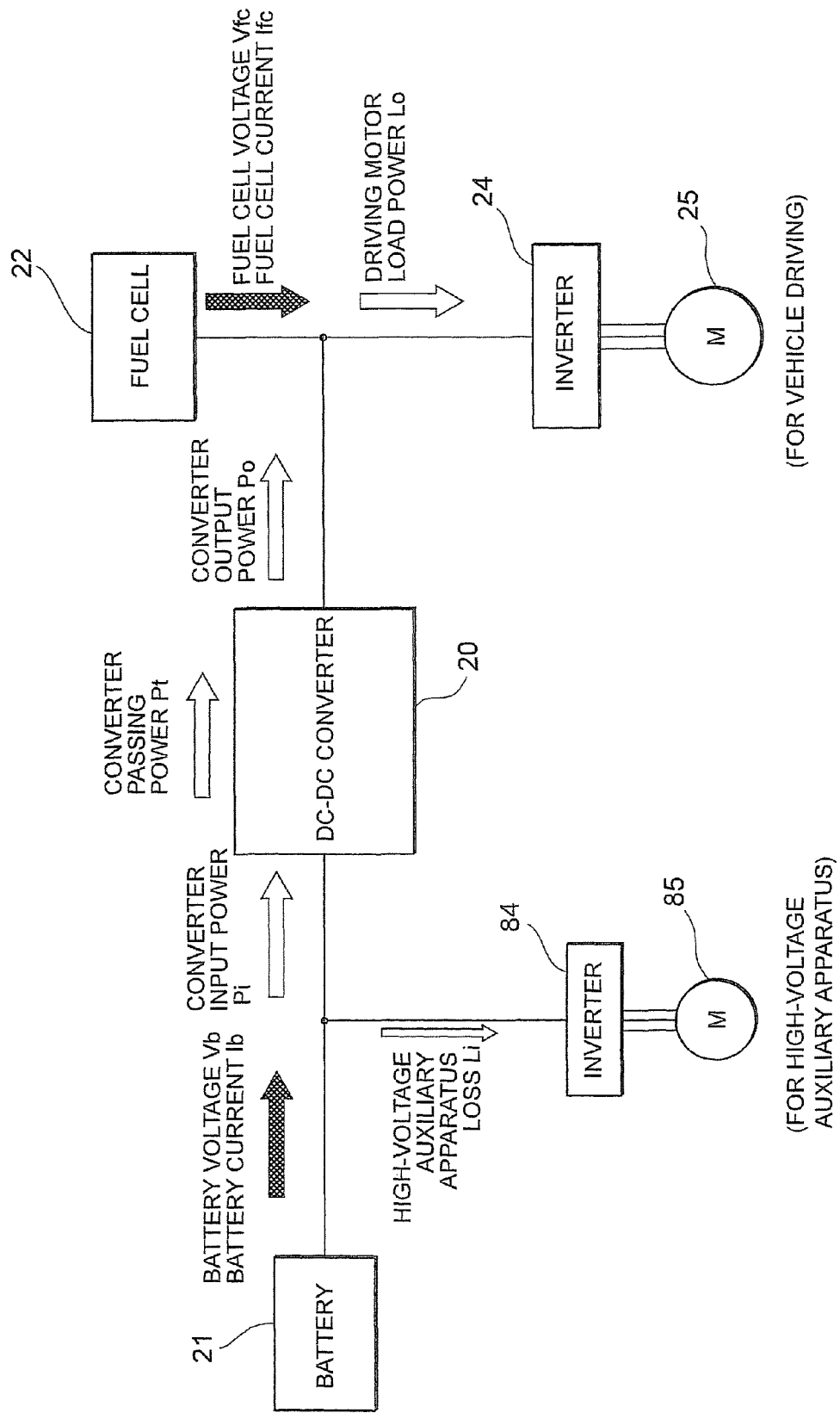
FIG. 3 is a circuit block diagram for explaining the flow of current, voltage and power in major paths of a circuit composed mainly of the DC-DC converter 20.

FIG. 3 is a circuit block diagram for explaining the flow of current, voltage and power in major paths of a circuit composed mainly of the DC-DC converter 20.

FIG. 3 shows an example of the flow of power, illustrating the case where power is supplied to the traction motor 25 from the battery 21 and the fuel cell 22. As shown in FIG. 3, the output power from the high-voltage battery 21 is divided to a drive power for the inverter 84 and an input power to the DC-DC converter 20, and from the inverter 84, a drive power (auxiliary apparatus loss) is supplied to a high-voltage auxiliary apparatus 85. The output power Pi of the DC-DC converter 20 is output to the traction motor 25 through the driving motor inverter 24.

While the fuel cell 22 is stopping power generation operation, for example, in an intermittent operation mode, only the power from the battery 21 is supplied to the driving motor inverter 24 via the DC-DC converter 20.

On the other hand, when the fuel cell 22 has spare power generation capacity, the output power from the fuel cell is supplied to the driving motor inverter 24, and also supplied in the direction opposite to the outline arrows in FIG. 3, from the secondary side to the primary side of the DC-DC converter 20, resulting in the battery 21 being charged with the power less a high-voltage auxiliary apparatus loss for the high-voltage auxiliary apparatus inverter 84.

Also, during a braking operation, the regenerative power generated by the traction motor 25 is supplied in a similar way to the above, from the secondary side to the primary side of the DC-DC converter 20 via the inverter 24, resulting in the battery 21 being charged with the power less a high-voltage auxiliary apparatus loss for the high-voltage auxiliary apparatus inverter 84.

(Explanation of Operation)

The hybrid controller 10 includes the detection unit and prohibition unit according to the present invention. The detection unit of the hybrid controller 10 monitors the state of the system based on information input from each sensor, etc. The items of the above monitoring include the detection of any system state that causes a rapid change in the voltage value commanded to the fuel cell 22 (see FIG. 5) during the aforementioned overall control of the power source. If a system state that causes a rapid change in the voltage value commanded to the fuel cell 22 is detected, the prohibition unit of the hybrid controller 10 outputs a converter control signal Cc for switching off a flag (single-phase drive flag) for permitting the DC-DC converter 20 to be driven in a single phase. Conversely, if termination of such a system state that causes a rapid change in the voltage value commanded to the fuel cell 22 is detected, the prohibition unit outputs a converter control signal Cc for switching on the flag (single-phase drive flag) for permitting the DC-DC converter 20 to be driven in a single phase.

Figure 4:
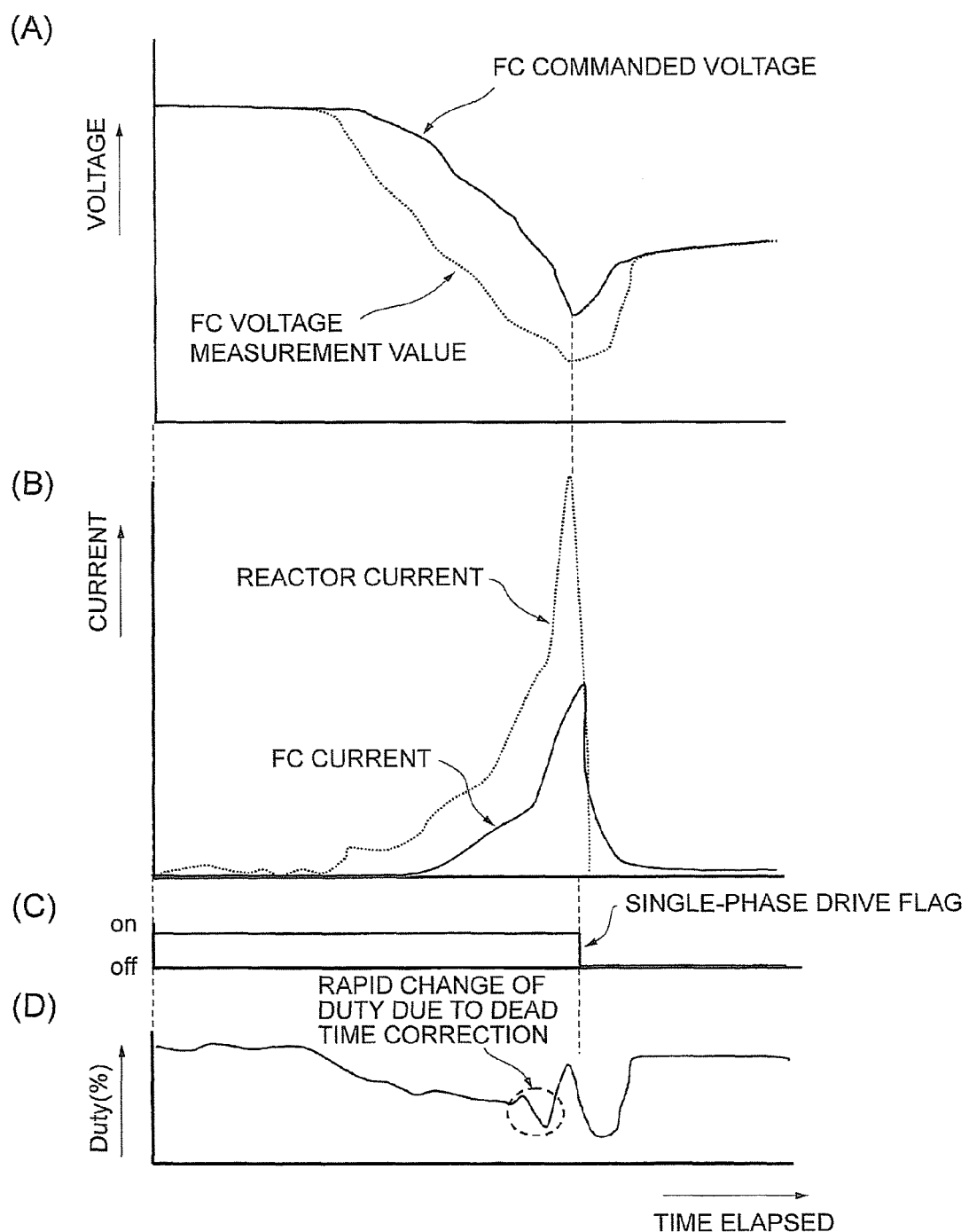
FIG. 4 is an explanatory diagram showing the mechanism that causes overcurrent in a reactor of the DC-DC converter 20, in which FIG. 4(a), FIG. 4(b), FIG. 4(c) and FIG. 4(d) respectively show: the relationship between a voltage commanded to an FC (fuel cell 22) and a measurement value; the relationship between an FC current and a reactor current; the timing of switching on/off a single-phase drive flag; and the relationship between a dead time correction and a duty ratio.

FIG. 4 is a diagram for explaining problems that would occur if the number of active phases is not changed according to the system state as described above and the number of active phases continues to be small, e.g., only a single phase. FIG. 4(*a*), FIG. 4(*b*), FIG. 4(*c*) and FIG. 4(*d*) respectively show: the relationship between the voltage value commanded to the fuel cell (FC) 22 and the measurement value of the actual output voltage; the relationship between the fuel cell (FC) current and the reactor current that flows through the reactor L of the converter; the on/off status of the single-phase drive flag; and the relationship between a dead time correction performed in a transitional period of the change in power and the duty ratio of the switching of the phase circuits P.

When the DC-DC converter 20 is driven in a single phase, if the system goes into a state that causes a rapid change in the system state, i.e., a state that causes an output voltage command value with a specific rate of change or more change (see FIG. 5), a response lag would occur, resulting in a large difference between the voltage command value and the measurement value of the actual output voltage (FIG. 4(*a*)). When such a large difference is observed, a dead time correction is applied, and the duty ratio of the switching pulse in the DC-DC converter 20 changes rapidly (FIG. 4(*d*)). During the above, the single-phase drive flag is on and single-phase driving is continuing (FIG. 4(*c*)). When the duty ratio of the switching pulse changes rapidly, the reactor current in the DC-DC converter 20 increases sharply (FIG. 4(*b*)). Here, since the DC-DC converter 20 is driven in a single phase, the passing current concentrates in a V phase (sharp increase of the reactor current shown in FIG. 4(*b*)). Such a sharp increase of the reactor current would result in an unfavorable condition where devices/circuits could be destroyed due to heat. Thus, in the present invention, a system state that causes a sharp increase of the output voltage command value, which would result in overcurrent in the converter as stated above, is defined in advance, and if the system goes into that state, the hybrid controller 10 controls the flag for permitting single-phase driving so as to prohibit the operation of the DC-DC converter 20 in a predetermined number of phases or less, single-phase driving in this embodiment.

FIG. 5 is an explanatory diagram showing the classification of the system states that causes a rapid change in the voltage value commanded to the fuel cell 22.

FIG. 5 shows "FC (fuel cell) power generation state" and "FC (fuel cell) power generation mode" as the items for classification of the cases where single-phase driving is not prohibited, and also shows the corresponding "system state." If the system is in the indicated "system state" in each power generation state, an operation in a smaller number of phases (single phase in this embodiment) is prohibited.

For example, under a normal operation mode, at least one of the following states is included.

1) The state of being in a startup sequence for the fuel cell system, or being in a certain period upon shifting from the startup sequence to the normal operation until operation condition is stabilized, is included. More specifically, the above state refers to a specific period from the time the startup sequence (e.g., system check and warm-up operation) is completed and the fuel cell voltage is reduced in response to the control of the accelerator.

2) The state of being in hydrogen consumption control for the fuel cell is included. More specifically, the above state refers to the state where the system is powered off by the driver, the system is shut down, the fuel cell is intermittently or continuously switched to a power-generation mode to consume the fuel gas in the fuel gas piping of the fuel cell, and the output voltage could be changed to a predetermined low voltage that is a power-generation voltage.

3) The state of detecting whether any welding has occurred in a relay of the fuel cell is included. More specifically, in order to detect that the relay contact does not recover from the ON state even though no current flows for operating the relay, the voltage of the fuel cell side of the voltage converter is increased and decreased without applying current for operating the relay, and whether any welding has occurred in the relay is inspected according to the detected current from the fuel cell. The above state refers to the state where the output voltage of the fuel cell is changed for that inspection.

4) The state of being in current limitation processing for the fuel cell is included. More specifically, if any of the cell voltages detected by a cell monitor which is provided in the fuel cell 22 goes down to a reference voltage or lower, current supply from the fuel cell should be temporarily stopped, and the above state refers to the state where the output voltage of the fuel cell is returned to a predetermined high voltage for that purpose.

5) The state of being in output limitation processing is included. More specifically, the above state refers to, for example, the state where, when an error signal due to overcurrent or overheat is output from the inverter 24 that supplies current to the traction motor 25, the output voltage of the fuel cell is returned to a predetermined high voltage so as to temporarily stop current supply to that load device. The above state also includes the state where output limitation is commanded by the hybrid controller 10 due to an increased temperature of the fuel cell 22 or for reasons pertaining to the fuel gas supply system.

6) The state of being in a shutdown sequence for the fuel cell system is included. More specifically, the above state refers to the state where the system is powered off by the driver, no output request is issued to the system, and the output voltage of the fuel cell is returned to a predetermined high voltage so as to reduce the output current of the fuel cell.

The system state that causes a certain amount of change or more in the output voltage command value for the fuel cell includes the state where the system is in transition from a normal operation mode to an intermittent operation mode. This refers to the state where, in order to shift the system from a power generation state to a stop/stand-by state, power supply to a load device is stopped and the output voltage of the fuel cell is changed to a predetermined high voltage in order to reduce the power generation current.

The system state that causes a certain amount of change or more in the output voltage command value for the fuel cell includes, under an intermittent operation mode, at least one of the following states.

1) The state of detecting any fuel gas leakage from the fuel cell system is included. More specifically, whether or not fuel gas leaks from the fuel gas piping, etc., of the system needs to be inspected in the state in which the power generation by the fuel cell is stopped, and the above state refers to the state where the fuel cell is rapidly changed to have a predetermined high voltage or a high-voltage prevention voltage for that inspection.

2) The state of being in an intermittent operation where a load device does not operate is included. More specifically, since the insulation resistance needs to be checked while changing the power generation voltage of the fuel cell, the power generation voltage is changed for that purpose.

3) The state of being in a predetermined period of return processing from catalyst activation processing for the fuel cell is included. More specifically, in the refresh processing, the output voltage of the fuel cell needs to be reduced to a predetermined low voltage that causes the reduction reaction of the catalyst.

4) The state of being in a predetermined period of the return processing after the catalyst activation processing for the fuel cell is suspended, is included. More specifically, during the refresh processing, the fuel cell output voltage continues to be reduced to keep a low voltage for a certain period, thereby causing the reduction reaction of the catalyst; whereas, if it becomes necessary to suspend the refresh processing, the output voltage of the fuel cell needs to be returned to the former state.

The system state that causes a certain amount of change or more in the output voltage command value for the fuel cell includes, for example, the state where the system is in transition from an intermittent operation mode to a normal operation mode. More specifically, when an output request is issued to the system (e.g., the accelerator is pressed) and power needs to be supplied directly from the fuel cell, the fuel cell output voltage needs be reduced to increase the output power.

The system state that causes a certain amount of change or more in the output voltage command value for the fuel cell includes, under a normal operation mode or an intermittent operation mode, at least one of the following states.

1) The state of being in a certain period upon permission or prohibition of a high-voltage prevention operation until voltage condition is stabilized, is included. More specifically, permission and prohibition of the power generation with the high-voltage prevention voltage are controlled and switched in accordance with the system state, the power generation state of the fuel cell, a low-temperature operation mode, the switching of controls for temperature increases in a power storage device, etc. The output voltage of the fuel cell changes rapidly upon such switching of permission and prohibition.

2) The state of being with a target voltage of the high-voltage prevention operation showing a predetermined rate of change or greater rate of change is included. More specifically, if the fuel cell system is utilized as a drive source of an electric vehicle, the target voltage of the high-voltage prevention operation changes in response to the gear shift position, and accordingly, when any gear shift is detected, the output voltage of the fuel cell can be expected to change.

3) The state of being in a certain period upon permission or prohibition of power supply to a load device until power condition is stabilized is included. More specifically, if the fuel cell system is utilized, for example, as a power source of an electric vehicle, the output voltage of the fuel cell changes, for example, if an error, such as overheat, is detected in a traction motor itself or in an inverter and the drive permission state is changed.

Note that the above described states are just examples of the system state that causes a rapid change in the output voltage command value, and the system state is not limited to those states, but includes any state where the current passing through the DC-DC converter could increase temporarily due to the change in the output voltage.

Figure 6:
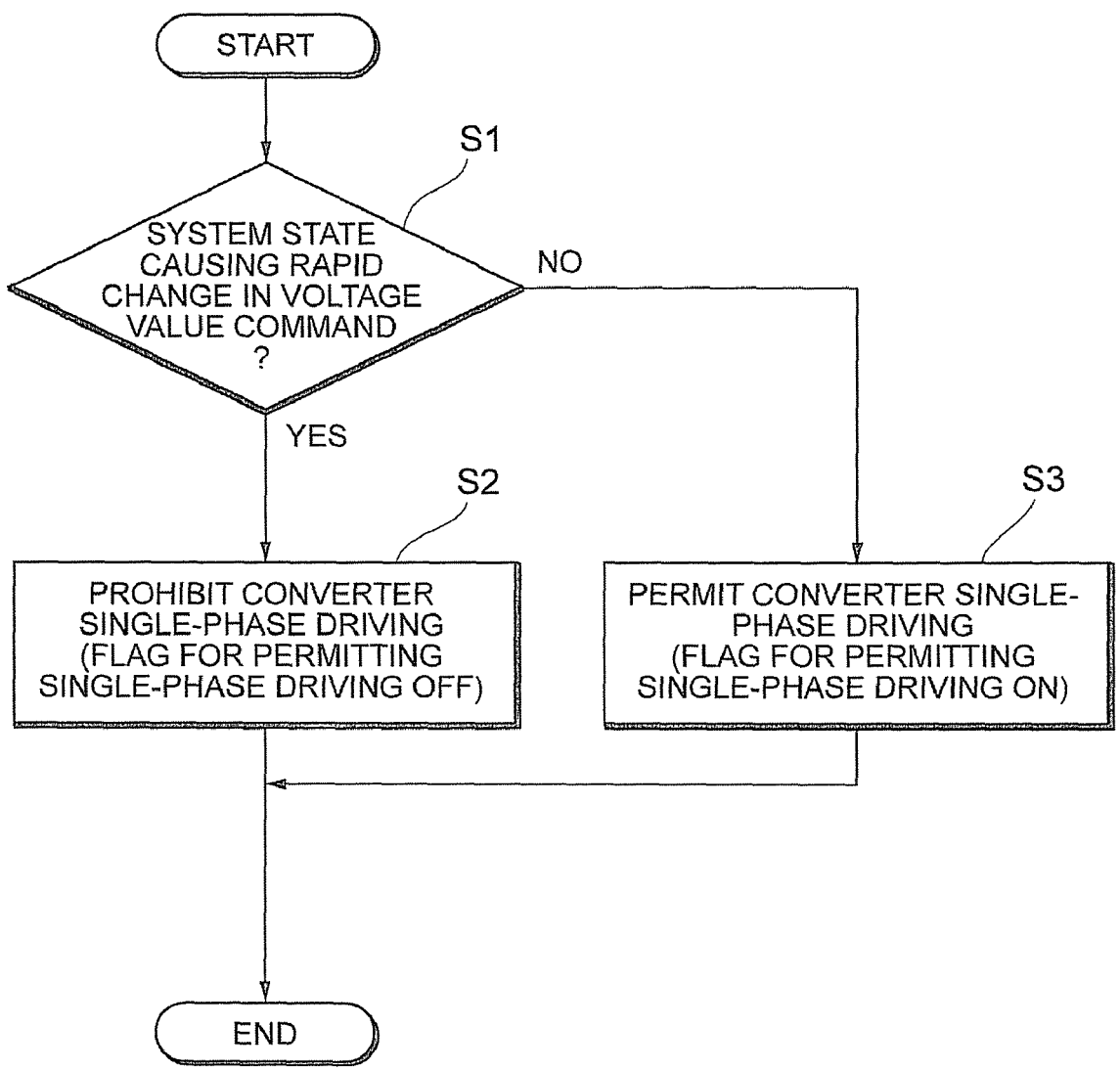
FIG. 6 is a flowchart illustrating the system state monitoring operation of a hybrid controller 10 regarding a commanded voltage value.

Next, how the hybrid controller 10 operates to monitor the system state regarding the commanded voltage value will be explained with reference to the flowchart in FIG. 6 illustrating the system state monitoring operation of the hybrid controller 10 regarding the commanded voltage value.

First, in step S1, whether or not the system is in any system state that causes a rapid change in the voltage command value (see FIG. 5) is checked. If the system is in a state that causes a rapid change in the voltage command value (YES), the processing goes to step S2, and if the system is not in a state that causes a rapid change in the voltage command value (NO), the processing goes to step S3.

In step S2, since the system is in a state that causes a rapid change in the output voltage command value, in order to prohibit the DC-DC converter 20 from being driven in a single phase, the hybrid controller 10 outputs a converter control signal Cc for resetting the flag for permitting single-phase driving off to the power source controller 11. In response to the converter control signal Cc, the power source controller 11 resets the flag for permitting single-phase driving, and prohibits the DC-DC converter 20 from being driven in a single phase from that time until termination.

On the other hand, in step S3, since the system is not in a state that causes a rapid change in the output voltage command value and thus single-phase driving is also available, in order to permit the DC-DC converter 20 to be driven in a single phase, the hybrid controller 10 outputs a converter control signal Cc for setting the flag for permitting single-phase driving on to the power source controller 11. In response to the converter control signal Cc, the power source controller 11 sets the flag for permitting single-phase driving. If the single-phase drive flag has been off until that time, the prohibition of single-phase driving will be terminated by this operation. From that time, the DC-DC converter 20 will be permitted to be driven in a single phase.

(Other Modifications)

The present invention is not limited to the above-described embodiment, and may be applied with modifications in various ways.

For example, in the above embodiment, a system state that causes a rapid change in the output voltage command value for the fuel cell is detected and the change of the number of phases is controlled to be prohibited in advance, but the hybrid controller 10 may be configured to monitor the output voltage command value, and control the power source controller 11 to prohibit the change of the number of phases if the output voltage command value shows a certain amount of change or more.

Also, in the above embodiment, the DC-DC converter 20 has a three-phase circuit and changing three-phase driving to single-phase driving is prohibited if a predetermined system state is detected, but the invention is not limited thereto. For example, the DC-DC converter may have two phases, or four or more phases. Furthermore, the target number for prohibiting the change of the number of phases may be greater than one. More specifically, the present invention may be applied such that, if a predetermined system state is detected when M to N+1 phases are active wherein M is the largest number of phases in operation and N is the target number for prohibiting the change of the number of phases, driving the converter in N phases or less is prohibited.

Also, the above embodiment shows an example where the change of the number of phases is controlled to be prohibited if the reactor current of the DC-DC converter 20 could increase rapidly, but the invention is not limited thereto. Points where overshoot could occur along with the decrease in the number of phases differ depending on the circuit configuration and control manner of the DC-DC converter. Accordingly, what is necessary is to carry out controls to prohibit the change of the number of phases by detecting any system state that causes overshoot in such points.

The invention claimed is:

1. A fuel cell system comprising:
a fuel cell;
a voltage converting system configured to be provided with a plurality of phases, the voltage converting system configured such that the number of active phases can be changed;
a load device; and
a power storage device connected to a primary side of the voltage converting system;
wherein the fuel cell is connected to a secondary side of the voltage converting system,
wherein the load device is connected to at least one of the primary and secondary sides of the voltage converting system, and
wherein the voltage converting system is programmed to change a duty ratio of a switching pulse if a difference is caused due to a response lag between an output voltage command value commanded to the fuel cell and an actual output voltage value of the fuel cell,
the fuel cell system further comprising:
a detection unit that detects a system state that causes a certain amount of change or more in an output voltage command value for the fuel cell; and
a prohibition system that is programmed to prohibit the voltage converting system from being driven in a predetermined number of phases or less if the system state that causes a certain amount of change or more in an output voltage command value for the fuel cell is detected.

2. The fuel cell system according to claim 1, wherein, if the system state that causes a certain amount of change or more in an output voltage command value for the fuel cell is detected and the voltage converting system is being driven in the predetermined number of phases or less, the prohibition unit changes the voltage converting system so that the voltage converting system is driven in a greater number of phases than the predetermined number of phases.

3. The fuel cell system according to claim 1, wherein the system state that causes a certain amount of change or more in the output voltage command value for the fuel cell includes, under a normal operation mode, at least one of the following states of:
   1) being in a startup sequence for the fuel cell system, or in a certain period upon shifting from the startup sequence to the normal operation until operation condition is stabilized;
   2) being in hydrogen consumption control for the fuel cell;
   3) detecting whether any welding has occurred in a relay of the fuel cell;
   4) being in current limitation processing for the fuel cell;
   5) being in output limitation processing; and
   6) being in a shutdown sequence for the fuel cell system.

4. The fuel cell system according to claim 1, wherein the system state that causes a certain amount of change or more in the output voltage command value for the fuel cell includes a state where the system is in transition from a normal operation mode to an intermittent operation mode.

5. The fuel cell system according to claim 1, wherein the system state that causes a certain amount of change or more in the output voltage command value for the fuel cell includes, under an intermittent operation mode, at least one of the following states of:
   1) detecting any fuel gas leakage from the fuel cell system;
   2) being in an intermittent operation where a load device does not operate;
   3) being in a predetermined period of return processing from catalyst activation processing for the fuel cell; and
   4) being in a predetermined period of the return processing after the catalyst activation processing for the fuel cell is suspended.

6. The fuel cell system according to claim 1, wherein the system state that causes a certain amount of change or more in the output voltage command value for the fuel cell includes a state where the system is in transition from an intermittent operation mode to a normal operation mode.

7. The fuel cell system according to claim 1, wherein the system state that causes a certain amount of change or more in the output voltage command value for the fuel cell includes, under a normal operation mode or an intermittent operation mode, at least one of the following states of:
   1) being in a certain period upon permission or prohibition of a high-voltage prevention operation until voltage condition is stabilized;
   2) being with a target voltage of the high-voltage prevention operation showing a predetermined rate of change or greater rate of change; and
   3) being in a certain period upon permission or prohibition of power supply to a load device until power condition is stabilized.

* * * * *